United States Patent Office 3,173,810
Patented Mar. 16, 1965

3,173,810
MANUFACTURE OF LEAD-ACID STORAGE BATTERY PLATES
Ernst Voss and Alexander Koenig, Frankfurt am Main, Germany, assignors to Varta Aktiengesellschaft, Frankfurt am Main, Germany, a corporation of Germany
No Drawing. Filed Nov. 21, 1961, Ser. No. 154,027
Claims priority, application Germany, Dec. 24, 1960, A 36,372
6 Claims. (Cl. 136—27)

The present invention relates to lead-acid storage battery plates, and more particularly to improvements in the manufacture of the active mass of such plates and in plates so produced.

The pastes now commonly used in making the familiar pasted-plate batteries are prepared by mixing some particular lead oxide or blend of oxides which may contain 20% to 50% of pulverized lead (called "lead powder" hereinafter) with a dilute solution of sulfuric acid. Reactions occur that result in the formation of basic lead sulfates $3PbO.PbSO_4.H_2O$ or $4PbO.PbSO_4$, in addition to unchanged lead and lead oxides remaining in the active mass paste. During the curing and drying of the paste, recrystallization produces a solid crystalline structure and practically all remaining lead is oxidized during drying. This leads to a rigid, self-supporting active mass.

In plates wherein the active mass is supported in tubes instead of a grid, litharge or lead powder is used to fill the tubes. When the tubes are relatively loosely filled, the active mass tends to be washed out of the tubes by the electrolyte during operation of the battery. While compaction of the powder in the tubes will decrease this tendency, undue expansion of such active masses during the battery operation tends to cause bursting of the tubes. For this reason, the bulk density of the active mass powder has been held down.

As is known, the litharge or lead powder must be sulfated by immersion in sulfuric acid. This causes a loss of time in the production cycle and also produces an element of uncertainty as to how far sulfation has proceeded, the basic lead content of the active mass exerting a considerable influence on the capacity (ampere-hours) of the battery at least during the first 10 to 20 operating cycles. The degree of sulfation depends on various operating factors, including the bulk or apparent density of the powder, its oxide content, the density of the sulfuric acid, the diffusion speed, etc., which cannot be readily coordinated to obtain any given result.

It is the primary object of the present invention to overcome these disadvantages and to produce a lead-acid storage battery plate with an active mass of any desired sulfate content and accordingly any desired bulk density.

It is another object of this invention to provide an active mass of such texture that it will tend to resist washing out during operation of the battery.

This and other objects are accomplished in accordance with the invention by supporting a dry mixture of lead powder and from 5% to 50%, by weight of the mixture, of lead sulfate powder on the plate, for instance, on the grid or in tubes, and subjecting the mixture to a water vapor treatment for about 20 minutes to three hours to raise its temperature to at least 50° C., preferably about 100° C. The preferred amount of lead sulfate varies between about 20% and 30%, by weight of the mixture, the amount of lead sulfate being varied according to the desired degree of sulfation and the corresponding bulk density with even filling.

The term "lead powder," used throughout the specification and in the claims, refers to any of the lead and lead oxide powders, and mixtures thereof, used in the battery industry, as described, for instance, on pages 21 and 22 of Vinal's "Storage Batteries," Fourth Edition, John Wiley & Sons, Inc., New York.

The treatment time will depend primarily on the thickness of the active mass and is so determined that the lead sulfate can react with the litharge in the lead powder to produce basic lead sulfate, the temperature being determinative of the amounts of $3 PbO.PbSO_4.H_2O$ and $4 PbO.PbSO_4$ being produced.

In this manner, a substantially self-suporting active mass is produced without loss of time involved in immersing the powder in sulfuric acid, the basic lead sulfate content can be accurately predetermined whereby the initial battery capacity is set and the active mass has a texture which resists washing out.

Formation may be initiated immediately following the water vapor treatment, thus eliminating the lengthy curing and drying times in conventional processes.

Since the specific weight of lead sulfate is smaller than that of lead oxides, the bulk density of the active mass powder mixture will be decreased, depending upon the lead sulfate addition, from about 3.5 g./cc. to 1.5 g./cc., the bulk density in the preferred range of lead sulfate of about 20% to 30% being about 3.0 g./cc.

In the following experiments, otherwide conventional lead-acid battery plates with tubes holding the active mass were provided with the indicated active mass powder mixtures, the active mass mixture in the tubes was subjected for 35 minutes to water vapor having a temperature of 100° C. and the thus treated active masses were formed in sulfuric acid having a density of 1.15, first with a current of 2 amperes/sq.dm. for 22 hours and then with a current of 1 ampere/sq.dm. for 40 hours.

Discharge was effected at the indicated amperage in excess sulfuric acid of a density of 1.24 until a discharge end voltage of 1.7 volt was attained. Two plates (I and II) were used with each indicated mixture for control purposes.

EXAMPLE 1

Mixture of lead powder with 7%, by weight, of $PbSO_4$, with a bulk density of 3 g./cc.

*Table I*

| Cycle | Ampere | Capacity (ampere-hours) | |
|---|---|---|---|
| | | Electrode I | Electrode II |
| 1 | 6 | 21.2 | 22.5 |
| 2 | 6 | 24.9 | 25.5 |
| 3 | 6 | 24.6 | 25.5 |
| 4 | 6 | 24.9 | 25.5 |
| 5 | 6 | 26.0 | 27.0 |
| 6 | 6 | 25.5 | 26.0 |

Composition of the mixture: 70% PbO, 23% Pb, 7% $PbSO_4$.

EXAMPLE 2

Mixture of lead powder with 17.5%, by weight, of $PbSO_4$, with a bulk density of 3.3 g./cc.

*Table II*

| Cycle | Ampere | Capacity (ampere-hours) | |
|---|---|---|---|
| | | Electrode III | Electrode IV |
| 1 | 4 | 24.6 | 27.3 |
| 2 | 4 | 30.0 | 31.0 |
| 3 | 4 | 33.0 | 34.0 |
| 4 | 4 | 32.7 | 33.0 |
| 5 | 6 | 30.0 | 30.0 |

Composition of the mixture: 62% PbO, 20.5% Pb, 17.5% $PbSO_4$.

EXAMPLE 3

Mixture of lead powder with 46.5%, by weight, of $PbSO_4$, with a bulk density of 2.7 g./cc.

Table III

| Cycle | Ampere | Capacity (ampere-hours) Electrode V |
|---|---|---|
| 1 | 6 | 30.6 |
| 2 | 6 | 31.0 |

Composition of the mixture: 41.5% PbO, 12% Pb, 46.5% $PbSO_4$.

If the ratio or percentage of use obtained per weight unit of active mass for 3 hours of 6 ampere current is expressed by the formula $$\alpha_{3h} = \frac{Ah_{exp.}/kg}{Ah_{theor.}/kg}$$

wherein $Ah_{exp.}$ is the actual parameter of ampere-hours (capacity) per kilogram of active mass and $Ah_{theor.}$ is the theoretical parameter of capacity per kilogram of active mass, the following Table IV shows the high percentage of use obtained with the active mass of the present invention:

Table IV

| Example | Bulk density, g./cc. | Active mass $PbO_2$ per plate (g.) | Cycle | Capacity, Ah | $\alpha_{3h}$ (percent) |
|---|---|---|---|---|---|
| 1 | 3.0 | 290 | 5 | 26.5 | 40.7 |
| 2 | 3.3 | 309 | 5 | 30.0 | 43.4 |
| 3 | 2.7 | 224 | 2 | 31.0 | 61.8 |

Compared with the values of 40.7%, 43.4% and 61.8%, depending on the increase in lead sulfate content in the powder, a conventionally produced active mass shows a value $\alpha = 32\%$ to 33%.

While the invention has been described and exemplified in connection with certain preferred embodiments, many variations and modifications may occur to the skilled in the art without departing from the spirit and scope of this invention as defined by the appended claims.

We claim:

1. In a process of producing an electrode plate for a lead-acid storage battery, the steps of supporting a dry mixture of lead powder and from 5% to 50%, by weight of the mixture, of lead sulfate powder on the plate, and subjecting the dry mixture to a water vapor treatment at a temperature of about 100° C. for about 20 minutes to about three hours.

2. The process of claim 1, wherein the mixture contains from 20% to 30%, by weight of the mixture, of lead sulfate powder.

3. In a process of producing an electrode plate for a lead-acid storage battery, the steps of supporting a dry mixture of lead powder and from about 20% to about 30%, by weight of the mixture, of lead sulfate powder on the plate, subjecting the dry mixture to a water vapor treatment at a temperature of about 100° C. for about 20 minutes to about three hours to obtain a self-supporting active mass, and then subjecting the active mass to formation.

4. An electrode plate for a lead-acid storage battery, comprising an active mass produced by subjecting a dry mixture of lead powder and from 5% to 50%, by weight of the mixture, of lead sulfate powder to a water vapor treatment at a temperature of about 100° C.

5. The electrode plate of claim 4, wherein the mixture contains from 20% to 30%, by weight, of lead sulfate powder.

6. In an electrode plate for a lead-acid storage battery and comprising a plurality of tubes: a substantially self-supporting active mass in said tubes produced by subjecting a mixture of lead powder and from 5% to 50%, by weight of the mixture, of lead sulfate powder to a water vapor treatment at a temperature of at least 50° C.

References Cited by the Examiner

UNITED STATES PATENTS 2,315,188  3/43  Clapson _____ 23—127
2,686,213  8/54  Smyth _____ 136—27

FOREIGN PATENTS 360,071  11/31  Great Britain.

JOHN H. MACK, *Primary Examiner.*

JOSEPH REBOLD, JOHN R. SPECK, *Examiners.*